(12) United States Patent
Seidner et al.

(10) Patent No.: US 9,758,738 B2
(45) Date of Patent: Sep. 12, 2017

(54) GREEN RENEWABLE LIQUID FUEL

(71) Applicants: Marc Seidner, Los Angeles, CA (US); Leo Seidner, Los Angeles, CA (US); Hanya Seidner, Los Angeles, CA (US)

(72) Inventors: Marc Seidner, Los Angeles, CA (US); Leo Seidner, Los Angeles, CA (US); Hanya Seidner, Los Angeles, CA (US)

(73) Assignee: Permanente Corporation, Los Angeles, CA (US)

(*) Notice: Subject to any disclaimer, the term of this patent is extended or adjusted under 35 U.S.C. 154(b) by 0 days.

(21) Appl. No.: 14/542,186

(22) Filed: Nov. 14, 2014

(65) Prior Publication Data

US 2016/0137939 A1    May 19, 2016

(51) Int. Cl.
*C10L 1/32*      (2006.01)
*C10L 10/02*     (2006.01)
*C10L 5/44*      (2006.01)
*C10L 9/08*      (2006.01)

(52) U.S. Cl.
CPC ............. *C10L 1/322* (2013.01); *C10L 10/02* (2013.01); *C10L 5/447* (2013.01); *C10L 9/083* (2013.01); *C10L 9/086* (2013.01); *C10L 2200/0438* (2013.01); *C10L 2200/0446* (2013.01); *C10L 2200/0469* (2013.01); *C10L 2250/06* (2013.01); *C10L 2270/026* (2013.01); *C10L 2290/02* (2013.01); *C10L 2290/06* (2013.01); *C10L 2290/08* (2013.01); *C10L 2290/28* (2013.01); *C10L 2290/46* (2013.01); *Y02E 50/30* (2013.01)

(58) Field of Classification Search
CPC .. C10L 1/322; C10L 10/02; C10L 2200/0469; C10L 2250/06; C10L 2270/026; C10L 2290/06; C10L 2290/28
See application file for complete search history.

(56) References Cited

U.S. PATENT DOCUMENTS

| 4,519,206 A | * | 5/1985 | van Michaels | F02B 53/02 123/204 |
| 8,877,995 B2 | * | 11/2014 | Baird | C10L 1/00 201/21 |
| 2011/0258914 A1 | * | 10/2011 | Banasiak | C10B 49/10 44/307 |
| 2012/0277499 A1 | * | 11/2012 | Boon | C10B 49/22 585/240 |
| 2013/0139432 A1 | | 6/2013 | Shu et al. | |

OTHER PUBLICATIONS

International Search Report for PCT/US2015/060457 dated Jan. 14, 2016.

* cited by examiner

*Primary Examiner* — Cephia D Toomer
(74) *Attorney, Agent, or Firm* — Rutan & Tucker LLP; John K. Fitzgerald

(57) ABSTRACT

A liquid fuel derived from processed biomass having extremely low water content and suitable for use in diesel engines or as an additive to petroleum based fuels, or which can be used as a petroleum or coal slurry substitute in those uses where a lower cost fuel have reduced emission is desired, is described.

30 Claims, 4 Drawing Sheets

GREEN RENEWABLE LIQUID FUEL

BACKGROUND

The present invention relates generally to fuels derived from processed biomass, and more particularly to fuels that are a colloidal dispersion of processed heat treated charred biomass that can be used as substitutes for, or additives to, fluid bio-oil based fuels, and fluid petrochemical fuels.

It is widely recognized that the majority of energy produced throughout the industrialized world is based on the consumption of petroleum based liquid fuels. Such fuels have a high energy density, are relatively easy to transport and store, and can be used in a wide variety of engines and heaters. However, as is common knowledge, the in-ground stores of petroleum based products are rapidly declining, and experts predict that new discoveries are not occurring frequently enough to offset the rapid drawdown of currently known reserves. In the parlance of today, these resources are considered to be non-renewable. Furthermore, use of these non-renewable resources are believed to produce climate changes and more immediately identified local environmental effects commonly associated with increased fouling of air and water and are generally considered pollution inducing and having a negative effect on the environment.

Various attempts have been made to identify renewable sources of energy that can be used in place of petroleum based fuels. For example, electricity can be generated using such renewable energy sources as wind, solar, geothermal and hydroelectric. While these energy sources are considered "clean" or "green" because they are renewable, relatively non-polluting, and are thought to produce a minimal to no carbon footprint or reduced emission profile on the environment from their use, they each have drawbacks due to location, convertibility, space, and wind and water availability. Essentially, these renewable resources are not always found in sufficient commercially available amounts in the locations where they are needed to enable their substitution for all commercially used non-renewable resources.

Coal is another source of energy that is widely used, but which is neither clean nor renewable. While advancements in technology have made the use of coal cleaner with less residual ash and lower atmospheric emission, coal cannot be used in all applications, particularly where use of liquid fuel is advantageous. Although coal can be processed into a water-based slurry, such a slurry cannot be used where a low water content fuel is needed to avoid emission of certain oxides and/or other pollutants, or where the water will cause damage to the equipment being powered by the combustion of the coal slurry.

Furthermore, coal slurry or fluid dispersions of coal still do not overcome the detrimental environmental effects caused by the combustion of coal for heat or energy generation. The type of coal typically used today, called steam coal, or sub-bituminous coal, is not pure, and includes a mixture of harmful heavy metals such as mercury and lead, toxins or other minerals such as sulfur that, when combusted, tend to adversely affect the combustion equipment and at the same time disperse into the air and water resulting in potentially harmful effects on people and the environment.

In view of the problems of using coal and petroleum derivatives to generate energy, various technologies have evolved to utilize renewable sources of energy from natural plant material through cultivation or natural growth and regeneration of woody based, grass based or cultivated vegetable based plant materials, such as wood chips, agricultural by-products, cultivated crops or harvested naturally growing plants and the like. However, unless these materials are handled in a particular manner which includes their being dried and processed bundled, chipped, pelletized, cubed, or baled or heat treated, such unprocessed natural plant products, commonly called "biomass," are difficult to use as fuel. The unprocessed biomass is typically either too wet, too cumbersome or costly to handle and transport, too prone to decomposition or rot when in a stockpile, too bulky and difficult to feed into conventional heat or energy generation equipment, or are simply too full of non-combustible, non-natural fiber materials, or contaminants such as metal, plastic, sand, gravel, dirt or other ash causing products to effectively bring them from the field, farm or forest directly to a heat or power generating plant for use.

All solid fuels power plants, including coal and biomass power plants are typically designed, engineered and built to use one type or class of fuel and are not easily reconfigured to change from one fuel type to another. For example, coal fired power plants cannot burn biomass without expensive and major engineering changes in their operation systems, usually rendering them unable to revert to coal once the changes to permit biomass combustion have been made. Biomass power plants using certain types of woody based fiber including wood chips in a specifically designed boiler system cannot be fed into the system alongside curbside garden variety aggregated biomass or crop generated by-products without special handling and pre-processing of the alternative fuels. Furthermore these natural cellulosic materials are comprised of a variety of differing cellular mechanical structures and chemical bonds which create their own sets of problems with respect to reduction of moisture content, management of size reduction or alteration, and particle production and handling to permit suitable commercial feeding as a fuel into conventional biomass heat or energy generating equipment.

The handling of biomass is problematic, and typically requires that a dedicated biomass generation plant be specially engineered to use certain specific types of biomass fuels. As discussed above, the biomass fuel type used in such a generation plant is typically not interchangeable with another type of biomass fuel. Biomass can be aggregated, chipped or chopped, ground up, dried and burned, but not all biomass can be mixed and processed homogenously, dried and burned with the same equipment and in the same manner. In addition, raw, unprocessed biomass type fuels (even if they have undergone a preliminary process, such as chipping or shredding) are not easily convertible or reducible into smaller more manageable and uniformly sized particles due to their inherent diverse ligno-cellulosic chemical and mechanical cellular bonds.

Consumption of biomass for the production of heat is one of the oldest processes known to man, and the production of energy from heat to steam to electricity is also well established. However, as society focuses its concern on the environment and air and water quality, it has been recognized that the combustion of conventional biomass, even if plainly dried and burned, releases chemical components such as volatile organic compounds (VOC's) and particulate matter generated during the combustion process that tends to foul the air and fill it with smoke, dust and ash.

Conventional biomass fiber fueled plants have become very costly and time consuming to build because they must be engineered and designed to consume biomass of a certain nature and to mitigate particulate and volatile organic compound emissions resulting from the burning of biomass. Furthermore, these plants must operate on a 24 hour basis daily, year in and year out in order to be cost effective producers of green clean energy and clean heat. They cannot simply start and stop at will, and are therefore used to produce electrical energy known as 'base-load' or 'firm base' energy. They produce energy that costs the same whether it is produced at 3:00 AM or at 2:00 PM. However, it is well known that nighttime energy is less valuable than peak daytime energy.

Accordingly, the economics of biomass power plants are problematic because they do not fit all situations of affordable biomass consumption or timely electrical demand. Furthermore, these types of plants are fixed in location and not mobile and because of the heavy nature of their construction are set into concrete and steel, hard wired and plumbed into power grid transformer stations, permitted in one area to operate, permitted for one type of fuel and one type of ash output. They are also typically constructed proximate to a biomass fuel supply for which they are engineered, and which is generally located not more than an eighty to one hundred mile radius from the plant. In some circumstances, the biomass fuel supply is not even available year round, but is seasonally harvested, grown or aggregated.

One problem that has not yet been overcome simply by air drying or evaporative heating of the biomass until the biomass has a moisture content considered dry enough to combust, for example, under five (5) percent but generally less than 25%, is that all unprocessed and not specifically heat-treated biomass is hydroscopic and hydrophilic. Dry biomass will not stay at the same moisture content if exposed to humidity or weather. If it is dry, it will absorb moisture and become wet once again. Whether or not the moisture is cellular moisture or surface moisture, the water has a negative effect on the heat output of combusting biomass, as water is an extinguishing media that prevents or materially slows biomass combustion. Consequently, all unprocessed air dried or evaporative dried biomass that is non-specifically heat-treated will absorb ambient moisture.

Moreover, biomass dispersed into moisture laden fluids will absorb fluid and may prevent the biomass from being a suitable heat or energy generating fuel. Even when the biomass is air or evaporative dried mechanically or otherwise, lignin and cellulose fiber bound together in the dry biomass are hydrophilic and that allows the biomass to wick up and hold moisture thereby negatively impacting the combustion capability of the fuel product. In such cases, the biomass may require some form of pre-heating or re-drying immediately prior to or along with combustion.

Furthermore, and most significantly, the mechanically and chemically bound lignin and cellulose in biomass are not easily broken down sufficiently even through air drying and evaporative mechanical drying to allow the biomass to be cost effectively and commercially reduced in size and consistent character, such as, for example, into a finely ground powder or even into minute micro or nano particulate sizes amenable to forming a slurry, suspension or liquid solution or a colloidal dispersion. Without changing the chemical and mechanical nature of the biomass through a specifically designed heat-treating processes, the biomass within the slurry, suspension, liquid solution or colloidal dispersion will remain hydrophilic and will retain the original inherent chemical and vegetative compounds that contribute to VOC and particulate emission pollution when the biomass is combusted.

Recently, various technologies for heat-treating and processing biomass have been developed which serve to alter the character of the biomass in a manner so as to provide a processed specially heat-treated biomass derived material for fuels that is hydrophobic and resists moisture wick up and absorption. These technologies remove VOC's and cellular particulate matter from the biomass, such as, for example, hemicellulose, that produces smoke and harmful emissions on combustion, and impart a hydrophobic, friable condition to the remaining heat-treated biomass which can be more easily and cost effectively processed into smaller particles that are fine enough to form a colloidal dispersion when mixed with a fluid type carrier.

Use of these technologies reduces the weight of the biomass feedstock product, increases the entrained energy density per pound of the remaining product, and creates a homogenous dry solid that can be pressed into a pelletized or cubed product which can be transported over long distances to plant locations where the processed solid biomass fuels can be consumed more cost effectively than unprocessed pelletized or chipped biomass. These process treatments also result in a product that is able to burn transparently with coal in un-modified coal fired power plants or in conventional biomass power plants. The mix of biomass feedstock used to produce the end-processed product is not identifiable in the final heat treated product because it becomes homogeneous, both in appearance and energy content.

One method involving specialty heat treating of biomass is known as torrefaction. There are several known methods of torrefaction characterized by the method and type of equipment and handling of the biomass furnished product. Torrefaction is characterized by roasting a raw biomass for a certain time and using a particular temperature curve in the absence of oxygen so as to prevent combustion of the biomass, to create a fuel product that has certain desirable characteristics which exceed those found in ordinary biomass.

Supertorrefaction, or fast flash torrefaction, is a technology that, as its name implies, results in achieving an intermediate or end product much more rapidly than other methods. To effectively produce an acceptable end product, supertorrefaction requires the biomass feedstock to be pre-processed to reduce moisture in the feedstock and to ensure that the feedstock particles are appropriately sized before heat processing. The pre-processed biomass is then heated with heat transfer agents such as organic molten salts during the supertorrefaction process.

Torrefaction involves a thermochemical treatment of previously air dried or moisture evaporated biomass at temperatures generally in the range of 250 to 350° C. for a specified time. The time and temperature may be varied depending on the type of biomass, its particle size, consistency of mix of furnish, type of chemical and mechanical bonds of the cellulose and lignin present. The biomass, which is typically woody based and generally having a pre-processing moisture content of less than 15-25%, is specifically heat-treated, roasted and charred in the absence of oxygen until it breaks the lignocellulosic bonds, removes the VOC's and hemicellulose, burns off or gasifies some minerals, chemicals and ultimately chars and embrittles the mix of lignin and carbon fiber.

Using the torrefaction process, a desirable furnish product can be created in a cost effective and appropriately commercial operating manner. Not all torrefaction technologies are suitable and not all automatically result in a desirable output product. When the processing is properly done, water contained in the biomass, as well as superfluous volatiles, primarily alcohols and hemicellulose, are released at lower temperatures and the biopolymers in the biomass, such as, for example, higher temperature burning oils, cellulose, and lignin remain. The process essentially fractures chemical and mechanical bonds, partly decomposing the biomass, and gives off various types of volatiles, low alcohols, some simple ash components and reducing or removing minerals salts from the resulting treated product.

The final torrefied biochar output product is a charred solid (not charcoal), relatively dry (average 2-5% moisture content or less), and blackened into a bio-char material that retains carbon, some lower oils, some traces of minerals, some gases, and some ash. The final product is hydrophobic and brittle, rendering it easily friable and suitable for pulverizing into a fine powder, and retains an energy content that is typically in the range of 9,500 BTUs per pound and 10,500 BTUs per pound. Under some time and temperatures, the energy density can exceed 12,000 BTUs per pound.

Since the torrefied biochar product is hydrophobic, it repels water and can be stored outdoors in most every outside climate condition including moist air or rain without any appreciable wick up change in moisture content or reduction of heating value, unlike the raw biomass from which it is made.

Moreover, given the torrefied biochar may be easily and cost effectively reduced to a finely ground and pulverized powder in micron, submicron and nano sized particles. Normally, this biochar would be pelletized or cubed for handling, storage and for eventual transport. As a cubed or pelletized product it can be compressed and densified to a higher density than raw biomass pellets or chips, and transported over greater distances at a lower cost than conventional biomass fuels and it can be combusted in any conventional biomass power plant, or for heat or for energy in any unmodified coal fired power plants. Leaving torrefied biochar in an unpelletized or uncubed state may allow undesirable dust to float in the air, which may create a hazardous storage condition, as an unwanted accumulation of torrefied dust particles in a confined storage space may result in a combustible or explosive air mixture.

The char process may be altered to accommodate biomass types having a moisture content of, for example, 30-45% or greater. For example, while heat-treatment torrefication of much drier biomass fiber is done at essentially low pressure or atmospheric pressure, a similar process resulting in.similar if not an identical finished biochar end product may be obtained using a process known as hydrothermal carbonization, or HTC.

The HTC process also heats the biomass but in the absence of oxygen and at a lower temperature and often with a longer exposure to heat, but at pressures of up to 700 psi or greater in an autoclave type environment. The resulting end product splits the raw biomass into a water laden liquid phase and a cellulosic lignin and carbon laden phase. This process also separates certain salts and other minerals and chemicals that can be diverted in the liquid phase from the cellulosic carbon minerals in the solid phase, and removes the moisture from the solid phase in the same process.

The HTC process has its own particular benefits for production operations. Biomass products processed in this manner generally include and begin with more wet (moisture laden) biomass fibers such as grasses and agricultural by-products, straws, wet agribusiness by-products and the like. The end product of the solid phase is also a friable, hydrophobic cellulose and lignin product that has the same ultimate grinding ability, hydrophobicity, and workability as the above described torrefied product and can be used much as the torrefied product described above.

A newer type of conversion process, known as CELF, or Co-Solvent Enhanced Lignocellulosic Fractionization, may also be used to process biomass types that, for example, consist primarily of smaller particles of woody based biomass, including such biomass as sawdust or shavings or agribusiness by-products such as hulls and seeds, shells, food or feed, processed waste such as cotton gin trash, grape pomace, crushed pits, feed mash or already ground smaller biomass fibers. This process is particularly useful where the output of the components from the biomass feedstock result in solutions which can be further processed and used for different purposes in different fuels, such as, for example, extracting alcohols and lighter oils, gasses, or solutions to be processed into gasoline or kerosene, or separation from heavier fuels such as biodiesel and ship's bunker fuels.

The CELF method processes the raw biomass furnish under lower heat and pressure than the previous processes resulting in a liquid component, which may include the solvents used to fractionate the components, water and a dissolved lignin component which can then be separated, and a solid cellulose component, which may be particulate in form, that can be extracted and used individually or together as building blocks for other fuels. Lignin and cellulose may then be processed into biofuel and cellulosic particles that will then be used or further processed to create submicron and nano particles by the same means of pulverizing and deriving powders as used with HTC or torrefication but, because of the chemical fractionization rate, it may be accomplished at a more rapid rate and at a lower temperature and shorter time to create a more diversely tailored output product.

A fourth process that may be used to create micron, submicron and minute nano-particles of biochar by specialized heat treatment is to use an abbreviated pyrolysis process where the biomass is processed in a much higher temperature environment, often at temperatures in excess of 500 degrees Centigrade, albeit for a shorter period of time, than in the previous processes and whereby the inherent VOC's and hemicellulose are removed rapidly in the beginning of the process and the resultant remaining cellulose and lignin product is charred but not completely pyrolized. In this form of heat treatment process, however, the off-gassed water vapor is removed and certain pyrolysis type oils, lower heavy oil, and tar compounds which are usually the last to be consumed and are turned to a gas vapor and distilled in a conventional pyrolysis process, instead remain in the residual lignin and cellulose biochar and are not removed from the cellular content of the carbon laden biochar.

The residual heavy oil and tar compounds that remain in the biochar particles after the abbreviated pyrolysis process increase the energy content of the char particles. This type of abbreviated pyrolysis process may be considered an advantageous method because the residual biochar itself has much of the energy that would otherwise have been already cooked out of it by the ordinary pyrolysis process and distilled into another product. In any event, the remaining biochar product, including the pyrolysis oil and tars, must be further processed to produce both a final biochar having hydrophobic and friable qualities.

All of the above processes provide a relatively dry (generally under 5% and more normally a 3% moisture content or less), particulate fuel that can be burned or gasified under the right conditions and in the right equipment to provide green, non-polluting heat and energy with a carbon neutral footprint and a substantially reduced emission curve as compared to conventional biomass or non-renewable fuels. However, the biochar product of the heat treatment processes described above is, without further processing and cautious handling, difficult to commercially bulk transport and store, dangerous to stockpile or deliver as a powder without causing a risk of airborne dust concentrations becoming an easily ignitable or even explosive mist, and difficult if not impossible to control and feed in a measured and controlled way into a variety of commonly used heat and energy generating equipment. It is also incompatible in dust form with ordinary bulk non-processed biomass fuels used in dedicated biomass heat or energy generation equipment.

Moreover, one approach to controlling the dust and storage problems of the torrefied product in a cost effective manner has been to pelletize or cube the torrefied biochar. However, pelletizing and cubing the biochar limits its use to equipment and feed streams that are designed only for such dry feedstock handling use.

Conventional liquid fuels today made from biomass are distilled, chemically cracked, fractionated, and refined through a number of highly complicated, expensive and critically engineered processes that destroy or remove the solid component from the fuel, extract sugars and/or other compounds, and in the end create a bio-oil or bio-gasoline or alcohol based fuel. No matter how these liquid biomass derived fuels are made, they are not solutions, liquid dispersions, or colloids because they have no particulate content in the final product. The process of creating a bio-gas, bio-oil, ethanol or methanol from raw biomass results in a by-product waste, sludge, or agglomerated lignin and cellulosic sugar depleted fiber and ash product. These waste by-products generally have been accorded little residual value, because their subsequent use relies on further processing the waste by-product to de-wet and dry the waste product before it can be burned or used as a soil amendment or component of animal feed without fostering undesirable bacteria or chemical compounds. Consequently, the conversion of these waste by-products has been complicated, problematic, and generally not cost effective.

What has been needed, and heretofore unavailable, is a practical, commercially viable and functional, low-cost process for producing and using a biochar based feedstock as a fuel to be used in a variety of commonly diverse heating and energy generation capacities, without requiring specifically dedicated, special purposed and designed and engineered biomass heating and electrical generating equipment. Such a biochar based feedstock should be able to be manufactured from a variety of different biomass furnishes, including various plant matter, including trees, bushes, agribusiness by-products, crops and grasses and other sources of raw biomass, for example, the waste product or sludge created by liquid biofuel manufacture. Such a biochar may be used in a number of diverse applications to create a fuel that can be used for the production of heat or energy. In some cases the biochar may be incorporated into a non-aqueous fluid that can be burned to produce heat or energy. The biochar may also be processed in such a manner that the liquid component of the raw biomass is separated and further processed to remove valuable minerals contained in the liquid component. Biochar based fuels should be able to be mixed with existing petroleum based fuels or refined biomass sourced oil based liquid fuels resulting in overall lower cost, lower emission fuels while maintaining or improving the energy content of the resultant fuel. The present invention satisfies these, and other needs.

SUMMARY OF THE INVENTION

In its most general aspect, the invention includes a method for compounding a non-aqueous biofuel derived from various solid but specially processed biomass furnishes into a liquid fuel that may be used in engines such as diesel engines and other internal combustion engines, combustion turbines as well be used in non-internal combustion devices where the fuel is burned to provide indirect generation of heat or energy, including diesel, gas or steam driven turbines.

In another general aspect, the specially processed biomass furnish is a biochar that may be manufactured using various processes. In one aspect, the biochar is created using a torrefication process that processes raw biomass into a brittle, friable, energy dense, low moisture content material.

In another aspect, the biochar is created using a process that results in a brittle, friable low moisture content component and a separate liquid component. In one aspect, the separate liquid component may be processed to extract chemicals and minerals present in the liquid component. The extracted chemicals and minerals may be further purified or processed.

In still another aspect, the feedstock for the special process used to create the biochar may include not only raw biomass, but also the waste product from processes that create liquid biofuels such as bio-gasoline, bio-oil, or various other energy containing liquid fuels, such as, for example, ethanol and methanol.

In another aspect, the biofuel is a colloidal dispersion of biochar in a petroleum or oil-biofuel base. Such a dispersion is advantageous in that it provides for supplementation of a petroleum based fuel in such a manner as to maintain or increase the energy content of the fuel while reducing the amount of petroleum product consumed while reducing the harmful environmental impact of use of the petroleum based fuel.

In still another aspect, the biofuel is added to heavy fuel oil such as, for example, bunker fuel oil to dilute or blend with the fuel oil, reducing both the percentage of harmful sulfur or other mineral components of the bunker fuel and reducing the overall price of the blended or diluted fuel while maintaining or increasing the energy content, lubricity, cetane value and other characteristics of the heavy fuel oil without increasing the amount of harmful emissions resulting from the combustion of the blended mix of biofuel and bunker fuel oil.

In another aspect, the invention includes a method of making a green biofuel based on renewable biomass feedstock, comprising: receiving biomass feedstock; processing the biomass feedstock to produce a low moisture biochar; particlizing the low moisture biochar; and forming a colloidal fluid from the particlized low moisture biochar and a non-aqueous combustible liquid.

In another aspect, processing the biomass furnish to produce a low moisture biochar includes torrefication of the biomass feedstock. In an alternative aspect, forming a colloidal fluid includes dispersing the particlized low moisture biochar in the non-aqueous combustible liquid. In one alternative aspect, the non-aqueous combustible liquid is bio-oil. In another alternative aspect, the non-aqueous combustible liquid is a petroleum based liquid. In still another alternative aspect, the petroleum based liquid is diesel fuel. In yet another alternative aspect, the petroleum based liquid is oil. In still another alternative aspect, the petroleum based liquid is bunker fuel oil.

In still another aspect, particlizing the low moisture biochar produces a low moisture biochar having a particle distribution in the range of 10 micron to 100 nanometers. In one alternative aspect, the particle distribution has an average particle size of 200 nanometers to 400 nanometers.

In yet another aspect, the low moisture biochar is hydrophobic. In still another aspect, the low moisture biochar is friable.

In another aspect, the biomass feedstock includes waste from a process that produces a combustible liquid from raw biomass. In still another aspect, processing the biomass feedstock produces a low moisture biochar and a liquid component.

In a further aspect, the invention includes a method further comprising extracting a selected material from the liquid component. In one alternative aspect, the selected material is selected from the group consisting of chemicals, salts and minerals. In another alternative aspect, the selected material is lithium.

In still another aspect, the invention includes a method of producing a green biofuel based on renewable biomass feedstock, comprising: receiving a renewable biomass feedstock; processing the renewable biomass feedstock to produce a friable hydrophobic biochar; particlizing the friable hydrophobic biochar into submicron size particles; and forming a colloidal fluid by combining the submicron size particles with a combustible liquid. In an alternative aspect, the combustible liquid is a bio-oil. In another alternative aspect, the combustible liquid is a petroleum based liquid. In still another alternative aspect, the combustible liquid is a blend of bio-oil and a petroleum based liquid. In still another alternative aspect, the combustible liquid is a petroleum based liquid blended with bunker oil. In another alternative aspect, the combustible liquid is bunker oil.

In yet another aspect, the invention includes a method of producing a biofuel from a biomass feedstock, comprising: receiving a biomass feedstock; processing the biomass feedstock to produce a low moisture biochar; particlizing the low moisture biochar; and combining the particlized low moisture biochar with a combustible liquid. In one alternative aspect, combining the particlized low moisture biochar with a combustible liquid forms a colloidal dispersion of the particlized low moisture biochar in the combustible liquid. In still another alternative aspect, the combustible liquid is bunker oil.

In yet another aspect, processing the biomass feedstock includes heating the biomass feedstock to form a solid biochar and a liquid. In still another alternative aspect, the liquid is processed to extract a selected chemical from the liquid. In another alternative aspect, the liquid is processed to extract a selected mineral from the liquid. In yet another alternative aspect, the liquid is processed to extract a selected salt from the liquid.

In another aspect, the invention includes a green liquid fuel; comprising a particlized solid biomass derived fuel dispersed into a non-aqueous liquid to form a combustible colloidal suspension. In an alternative aspect, the solid biomass derived fuel has an average particle size of less than or equal to 10 microns. In another alternative aspect, the solid biomass derived fuel has an average particle size in the range of one micron to 100 nanometers. In another alternative aspect, the non-aqueous liquid is petroleum based. In yet another alternative aspect, the petroleum based non-aqueous liquid is fuel oil. In still another alternative aspect, the non-aqueous liquid is a liquid biofuel.

Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENTS

Figure 1:
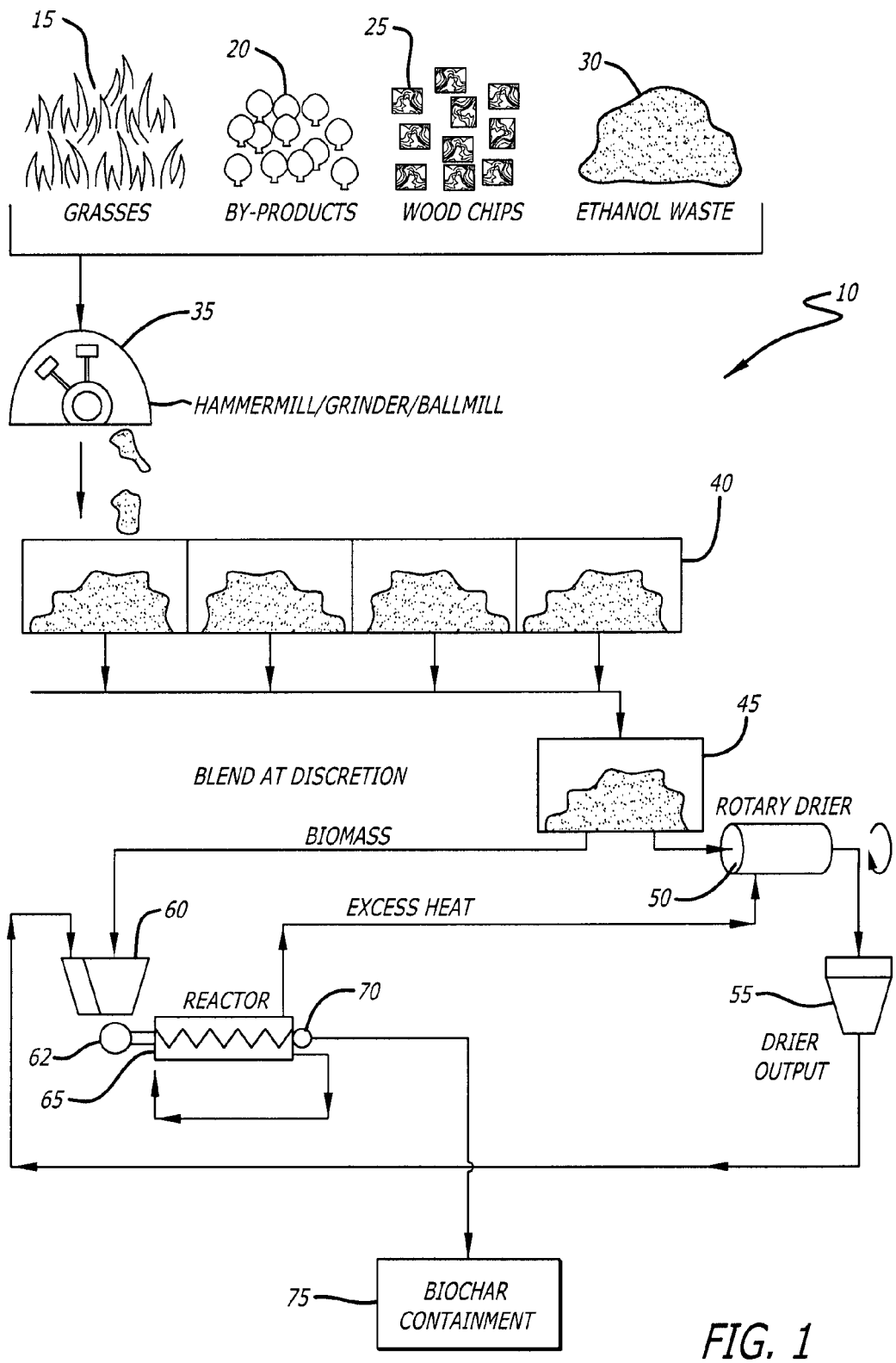
FIG. 1 is a graphical representation illustrating one embodiment of a process used to manufacture a biochar from raw biomass.

The process for manufacturing a petroleum or bio-oil based renewable biofuel will now be described. FIG. 1 illustrates one embodiment of a process 10 for treating raw biomass to manufacture a low moisture biochar. In this embodiment, biomass of various types 15, 20, 25 and 30 are accepted for processing to materially and substantially alter the form of the biomass from a high moisture laden or moisture compatible, hydrophilic, bulky and difficult to handle solid into an extremely low moisture content, hydrophobic, non-moisture compatible, friable solid of a more dense energy content than the original biomass furnish and into a product that may be further processed.

The feed stock for the process may be almost any plant or plant derived material, such as, for example, grasses 15, agricultural by-products 20, wood chips, 30 and waste from the production of ethanol 30. Examples of by-product from wood use operations include, but are not limited to, sawmill residue, chips, sawdust and shavings, hog fuel including bark, and logging slash. Examples of agricultural waste include, for example, but not limited to, nut shells or husks, pits, ground wood fiber, pomace, hulls, straw, cotton gin trash, vine or tree prunings or even woody based fiber and bark, limbs, trunks and branches from removed orchard trees, nursery or yard tree branches and trunks, remaining after one or more trees have been cut down, semi-processed and residual agribusines's by-products, and the like. Such furnish biomass is bulky, difficult to stockpile, expensive to transport, full of moisture or foreign matter including refuse, dirt, sand, metal, plastics, ash contaminants and other unacceptable particulate matter, and costly to process and typically has a very low heating value per unit of as-is weight. The aggregation of the feedstock may include chipping, grinding, crushing, and occasionally, washing and cleaning to remove field debris, and then windrow piling the feedstock. The biomass may also be compacted by its own weight in vans and open topped trailers used to transport the biomass to a secondary use or disposal site, or the biomass may be piled in windrows. At this stage of the aggregation, however, the biomass is not pelletized or cubed, is generally laden with moisture, and subject to energy loss through decomposition if the biomass is not properly air dried when being stockpiled.

In another embodiment, the waste sludge, lignin and cellulose content remaining from the production of ethanol, bio-oils, or distillation of biomass may also be used as a feedstock. This waste product may be used as a solitary feedstock, or it may be combined with the raw feedstocks described above.

The various types of biomass 15, 20, 25 and 30 typically undergo a process 35 to reduce the size of the biomass to a desired particle size for efficient processing. Process 35 may involve, for example, running the raw biomass through a hammer mill, a ball mill, a grinder, or some other mechanical process that cuts, shreds or otherwise reduces the size of the individual pieces of biomass to a desired size. The processed biomass may also be screened and/or washed to remove foreign matter.

In the embodiment of FIG. 1, the processed feedstock is stored in appropriate storage bins, stockpiles, containers or silos 40. In some embodiments, each type of raw biomass is stored separately from another type, although in some instances this separate storage is not necessary. As shown in FIG. 1, the various types of biomass may also be blended using a blender 45 to provide a raw biomass feedstock having desired characteristics and/or properties.

Depending on the type of raw biomass available, the raw biomass may be processed through a dryer, such as a rotary drier 50, although other types of driers may be used. Once the raw biomass is dried to a desired moisture level, the dried biomass may be transferred to a holding hopper 55, or may be transferred to a feed hopper 60.

Alternatively, when the moisture content of the raw biomass is suitable for further processing, or if the process can accommodate a high moisture level, the raw biomass may be directly transferred to feed hopper 60. At this point in the process, the raw biomass is processed into a char, various embodiments of which will be discussed in more detail below.

In the embodiment shown in FIG. 1, the raw biomass held in hopper 60 is fed through an airlock 62 into reactor 65. In this embodiment, the airlock 62 is used to prevent air from entering reactor 65 and the reactor is used to torrefy the raw biomass in the absence of oxygen to create a hydrophobic and friable biochar. During torrefication, the biomass is substantially changed in its appearance, chemistry, workability, and suitability as a fuel, resulting in a specially heat-treated intermediate biochar product that is completely homogeneous in appearance regardless of the feedstock or feedstocks used to create the biochar, and if, or when, blended with other biochar products similarly processed results in an end product that is indistinguishable in content and performance characteristics from any other biomass feedstock variety in the mix of original biomass furnish used.

Torrefaction is a pyrolytic thermochemical treatment of biomass at temperatures that typically range from 280 to 350° C. and for varying periods of time. The thermochemical treatment is generally carried out in reactor 65 under atmospheric, or slightly above atmospheric pressure in the absence of oxygen. During the torrefaction process, the water contained in the biomass is vaporized and released from the biomass, and the biopolymers (cellulose, hemicellulose and lignin, among others) present in the biomass partly decompose or deconstruct, and bonds are broken apart, giving off various types of volatiles and consuming hemicellulose in the process. When the process is complete, the remaining solid, dry, blackened material is commonly referred to as a "torrefied biochar."

The torrefied biochar resulting from the original biomass typically loses 20% to 25% of its mass and usually not more than 10% of its pre-processed weight to caloric heating value, densifying the energy content in the remaining resultant product and increasing the overall caloric value with reduced weight measure with no appreciable increase in volume. The volatiles given off during the torrefaction process may be collected and used as a heating fuel for the process. Typically, hemicellulose is consumed early in the process which beneficially removes the future combustion source of smoke, much particulate matter and lesser energy containing materials.

After the biomass is torrefied it can be compressed, crushed, pulverized, powdered and densified. In many cases, the char is formed into briquettes or processed into pellets using conventional densification equipment. Torrefied biochar is relatively hydrophobic, and will not wick up but instead repels water and thus can be stored outside where it may be exposed to moist air or rain without appreciable change in moisture content or heating value, unlike the original biomass from which it is made. Moreover, torrefied biomass biochar will not rot, compost, decompose or otherwise degrade in stockpile over time.

After the torrefaction process is completed, the torrefied biochar is removed from reactor 65 through airlock 70, and transferred to a biochar containment area, bin or vessel for storage of the biochar before further processing. Waste heat from the torrefaction process may be extracted from the reactor 65 and conveyed to drier 50, when a drier is used to decrease the moisture content of the raw biomass. This process is advantageous in that not only does it reduce the costs associated with drying the raw biomass, but it also renders the process more "green" in that less fuel needs to be consumed simple to dry the biomass. The off-gas heat and the VOC's that result for torrefaction may provide a fuel and heat combination that may be burned at higher temperatures in the rotary drier 50. Use of the off-gas heat and VOC's in this manner tend to render the heat source substantially less polluting.

In some embodiments, the biochar may be densified by pelletizing or cubing the biochar after it is extracted from the reactor and cooled. At this stage, the biochar is extremely friable and its dust tends to float in the air, which may make the biochar dangerous to store in loose bulky, dusty, powdered form.

Figure 4:
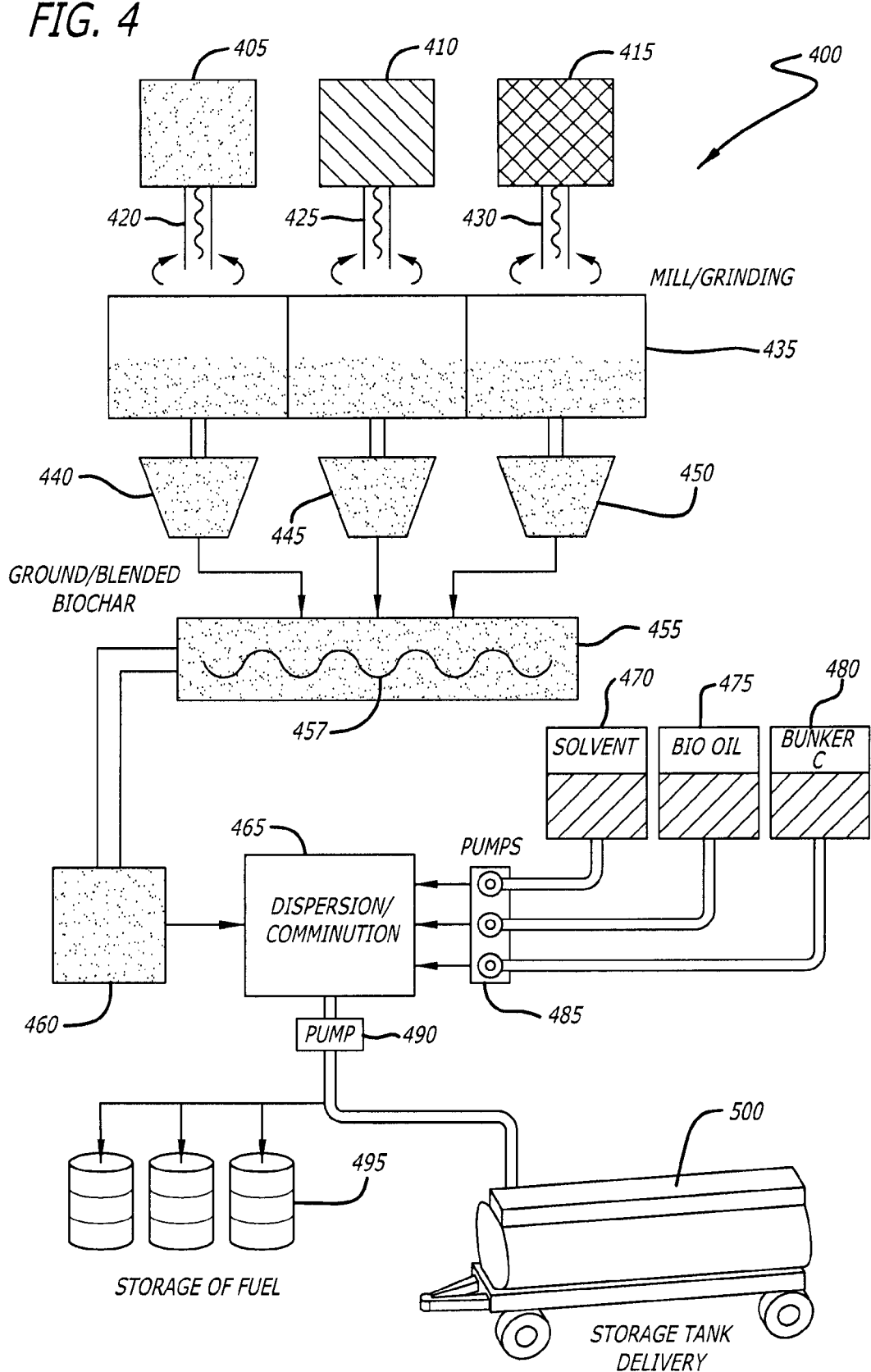
FIG. 4 is a graphical representation illustrating one embodiment of a process for manufacturing a liquid biofuel using the biochar manufactured using the embodiments of FIGS. 1-3.

FIG. 4 illustrates an embodiment wherein the biochar, instead of densification, pelletization or cubing, is ground or otherwise pulverized and processed to produce a fine dispersible low moisture content powdery material. The pulverization process may be controlled to produce the fine material in a variety of particle sizes and particle size distributions. The fine dispersible material may be combined through a comminution process with a non-aqueous solvent or fluid to provide a liquid biofuel.

The liquid biofuel may take several forms. For example, the particlized biomass char may be simply mixed into a slurry using the solvent. Depending on the viscosity of the fluid and the size of the ground char particles, and the effects of gravity however, the slurry may separate with time, which is disadvantageous.

In one embodiment, the liquid biofuel is created by forming a colloidal dispersion of the biochar and the solvent. In this process, the particle size of the biochar is small enough so that once the particlized biochar is dispersed into the solvent, a colloidal dispersion is formed. One of the principle characteristics of such a colloidal dispersion is that the dispersed particles do not settle out of solution and remain uniformly blended therein throughout the lifetime of the colloidal solution.

It has been determined that biochar particles having a particle size in the range of 1.0 micron to about 100-150 nanometers with a mode of 200 to 300 nanometers can be sufficiently dispersed into a non-aqueous medium such as bio-oil fuel or fuel oil or a mix of the two so as to form a colloidal dispersion. It will be understood, however, that different ranges are possible depending on the desired properties, such as blending medium, viscosity of the fluid and heat content, among other characteristics, of the final dispersion. For example, the particlized biochar may have differing particle size distributions, such as ten weight percent being particles of 10 microns or less, with other fractions being distributed so that the overall particle size distribution allows for forming a colloidal dispersion.

It will be understood that the amount of biochar dispersed into the non-aqueous solvent will affect the viscosity and heat content by volume of the resultant colloidal dispersion. Thus, the liquid biofuel may be formulated, designed, and manufactured having characteristics that are most desirable for use in particular applications.

As shown in FIG. 4, various types of biochar may be stored in storage bins 405, 410 and 415. In the embodiment shown, each type of biochar is processed by pumping or otherwise conveying 420, 425 or 430 the biochar to a mill or grinder 435. Alternatively, a single mill or grinder could be used to process more than one type of biochar without departing from intended scope of the invention.

As the biochar is milled or ground into a fine pulverized material, it may be further screened, processor or classified to remove ash, silica, salts, or other undesirable foreign or minerals as it is transferred to conditioning vessels where the biochar may be treated or processed as necessary, such as, for example, by catalytically treating the biochar with heat and pressure, to provide the energy content/density, moisture content and the like characteristics desired for the resulting biofuel. Optionally, the conditioned pulverized biochar may be stored in the conditioning vessels, hoppers or bins 440, 445, 450. Since the pulverized biochar has a very fine particle size, it may be advantageous to combine the pulverized biochar with a liquid carrier, such as a solvent or light fuel oil. Mixing the pulverized biochar with the liquid carrier is advantageous in that it mitigates the problems associated with the storage of finely pulverized combustible biochar. This mixing step may be done immediately after the biochar is ground, or it may take place later in the process stream, depending on the design of the solid and fluid content and the safety requirements of the manufacturer.

Referring again to FIG. 4, in embodiments where different types, particle sizes or consistency (or in the case where one or more biochar types have been fluidized by mixing with a liquid carrier), the various biochar feed streams may be combined in a mixer 455. Mixer 455 may achieve mixing of the various feed streams using a mechanical mixer, or alternatively, mixing may be accomplished using a static mixer 457 by pumping the various feed streams through the static mixer.

The output of mixer 455 may be stored in container 460, before being used a feed for dispersion/comminution/blending process 465. Alternatively, the output of mixer 455 may be fed directly into dispersion/comminution/blending process 465.

During the dispersion/comminution/blending process 465, the biochar from the mixer 455 or container 460 is combined with a selected liquid or blend of liquids to form a dispersion wherein the particles of biochar are dispersed throughout the liquid in a manner such that the biochar does not fall out of solution or settle due to gravity when the solution is stored. As described above, the particlized biochar from mixer 455 or container 460 is combined with a solvent or fluid 470, and/or bio oil 475 and/or a viscous fuel oil 480, such as, for example, heavy fuel oil (also called bunker C). Pumps 485 pump the desired fluid or mix into the dispersion process machinery 465 where the fluid is mixed with the pulverized biochar.

Once a liquid dispersion of biochar and selected solvent is created having a set of desired properties, such as, for example, a desired viscosity and/or energy density, the dispersion is pumped using pump 490 either to storage containers 495, or for further disposition, including distribution, to a tank truck 500.

Depending on the type of raw biomass that is available, other processes may also be used to create the solid cellulosic and lignin carbon biochar which is then dispersed into a liquid fuel. As will be discussed, not only may it be advantageous to employ these processes depending on the available raw biomass, but the output of the process may include both liquid and solid phases, each of which may be advantageously used to provide energy used in the process itself, or which may be further processed to provide a biofuel.

Figure 2:
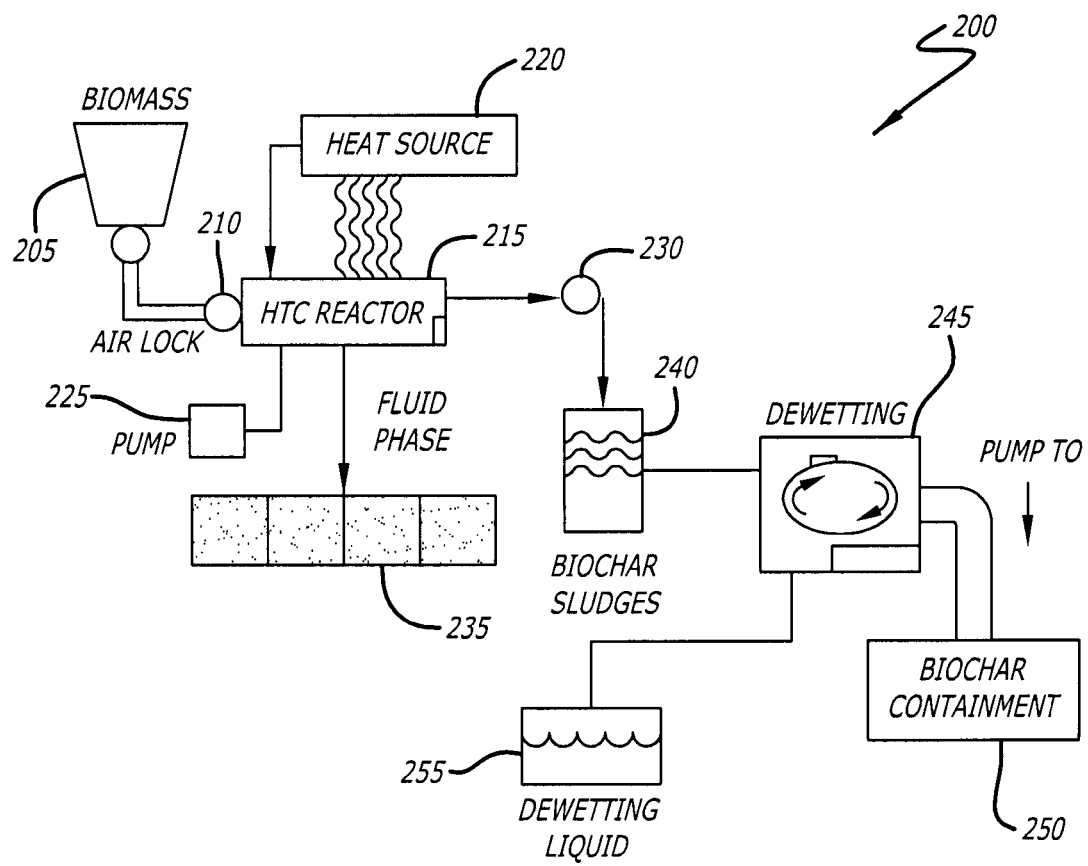
FIG. 2 is a graphical representation illustrating another embodiment of a process used to manufacture biochar from raw biomass.

In another embodiment, illustrated in FIG. 2, a process 200 is shown where raw biomass 205, which may be screened, ground or chipped, is fed through an airlock 210 into a reactor 215 where the raw biomass 205 is heated in the absence of oxygen and at a lower temperature than torrefaction and pyrolysis and often with a longer exposure to heat, but at increased pressures of up to 700 psi in an autoclave type environment. Heat is provided by a heat source 220, which may be fed by a portion of the off-gassing heat from the process and/or biomass consumed for heat, and the reactor may be pressurized using expanded gases put off by the biomass being consumed inside the reactor process. Additionally, the heat may be supplemented with added pressure of heated gasses retained and re-introduced using a pump 225.

The end product of this process splits the raw biomass into a water vapor laden liquid phase 235 and a bio-carbon laden "sludge" phase 240. The liquid phases and carbon laden phases are extracted from the reactor though suitable means, such as an airlock 230.

The liquid phase 235 may contain certain chemicals, salts and other minerals that can be extracted or separated from lignin within the liquid phase using techniques known in the art. These chemicals, salts and other minerals may be further processed and sold, thus providing a secondary income stream from the heat treatment process, while the resultant biocarbon appears as a biochar solid phase and may be used as a biofuel.

The biocarbon laden phase 240 may be further processed using a dewetting device 245. The output of the dewetting device is a liquid 255 and a solid appearing biochar. The solid biochar is transferred to a biochar containment 250 vessel or container as has been discussed previously. Depending on the properties of the liquid 255, that liquid may be further processed to remove water and used as a component of a biofuel, or it may be used to provide energy, such as for example, as a supplement to heat source 220, to the process to increase the efficiency of the process.

In another embodiment, the process of FIG. 2 may be modified using co-solvent enhanced lignocellulosic fractionization to process biomass types that consist primarily of smaller particles of woody based biomass, including such biomass as sawdust or shavings or agribusiness by-products such as hulls and seeds, shells, food or feed, processed waste such as cotton gin trash, pomace, ground pits, feed mash or already ground smaller fibers. This process is particularly useful where the output of the components from the biomass furnish can be used for different purposes in different fuels, such as, for example, extracting alcohols and lighter oils and gasses to be processed into gasoline or kerosene, or with heavier fuels such as biodiesel and ship's bunker fuels.

In this embodiment, the raw biomass feedstock, which may be cleaned and screened, with impurities removed, is sized reduced as much as practical, is placed in a vessel with certain chemicals, such as, for example, tetrahydrofuran (THF) and is treated using lower heat and pressure, and for a similar or shorter time, than in the other embodiments described herein, resulting in a liquid component consisting of THF, certain fluids and solvents; water; a dissolved lignin component; and a solid cellulose component that can be used individually or together as building blocks for other fuels. Lignin and cellulose may then be processed separately into biofuels. The solid cellulose particles that result from the process and are filtered or otherwise separated from the liquid component are suitable to be used and combined with other biocarbon feedstock to create micron, submicron, and nano-sized particles powders by the pulverizing and deriving processes described previously.

Figure 3:
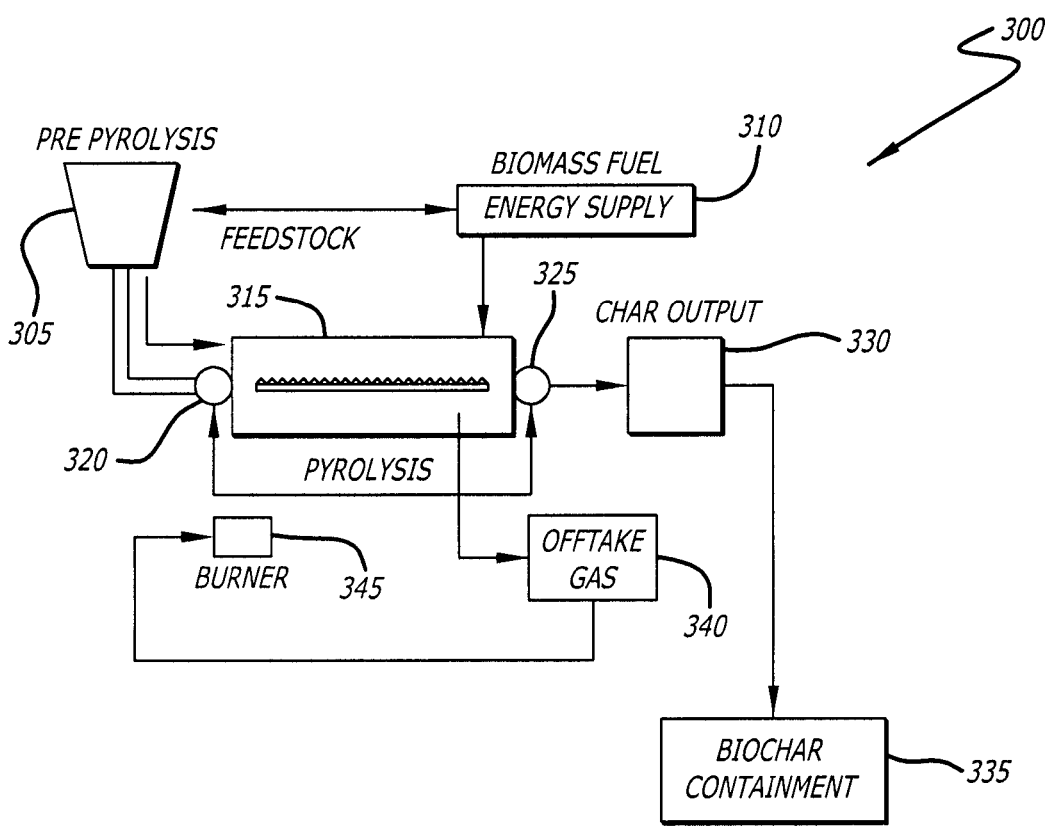
FIG. 3 is a graphical representation illustrating another embodiment of a process used to manufacture biochar from raw biomass.

In another embodiment, illustrated in FIG. 3, a process 300 of creating biochar is shown that includes creating micron, submicron and minute nano-particles of biochar by using an abbreviated pyrolysis process where the biomass is processed in a much higher temperature environment, often at temperatures in excess of 500 degrees centigrade, albeit for a shorter period of time than needed for full pyrolysis and previously described processes. In this embodiment, inherent VOC's and hemicellulose are removed rapidly in the beginning of the process and the resultant remaining product is charred but not completely pyrolized or made into a charcoal. In this form of heat treatment process, however, the pyrolysis oils, lower heavy oil, and tar compounds which are usually the last to be consumed and are turned to a gas vapor and distilled in a conventional pyrolysis process, instead remain in the residual biochar are not removed from the cellular content of the carbon laden biochar.

Raw biomass 310 may be used as a feedstock for the pyrolysis reaction or it may also be used to fuel the pyrolysis reactor 315. As shown, raw biomass, which may be pre-screened and/or washed to remove contaminants such as stone, gravel, sand, salt, metal, plastic or other ash causing substances, and then ground, chipped or pulverized, is fed from supply source 305 into pyrolysis reactor 315. Depending on the process used, air locks 320, 325 may be used to prevent oxygen from entering the reactor when feedstock is added to the reactor for processing, and when biochar is removed from the reactor, respectively. The char output may be further processed at block 330 before being transferred to a biochar containment vessel or container 335. Gases given off during the pyrolysis process may be extracted at box 340, and, in some embodiments, used to fuel or supplement the fuel burned in burner 345 that provides heat to the pyrolysis reactor.

The heavy oil and tar compounds remaining in the biochar particles after the abbreviated pyrolysis process shown in FIG. 3 increase the energy content of the char particles. This type of abbreviated pyrolysis process is advantageous because the residual biochar itself has much of the energy that would otherwise have been ultimately cooked out of it by the ordinary pyrolysis process.

Since the specially heat treated biochar from any of the embodiments described above is suitable to be finely ground and pulverized into a powder in micron, submicron and nano sized particles, and since those particles could then be combined with a suitable non-aqueous liquid, such as, for example, a petroleum based liquid, a new fuel comprised of heat treated biomass solids carried in a liquid form is created. As a liquid, the biofuel is easier to handle, transport, store, distribute, and consume than densified versions of the biochar, such as pellets or cubes.

The biochar created by the various embodiments described above is also compatible with petroleum or liquid biomass fuels, in the form of a fluid or as a solid suspended in a liquid, and stored as a liquid, pumped and conveyed as a liquid and delivered up to any variety of conventional liquid fueled heat or energy generating machinery and equipment in a consistent, measured and reliable manner. The biochar, dispersed into a non-water based fluid or as a pseudo liquid which would act, burn, combust and deliver energy similarly to current liquid fuels, becomes a new liquid fuel alternative. It will contain an increased caloric value over the non-water based fluid alone, but will also have substantially less environmental impact resulting from, for example, reduced sulfur, mineral, heavy metal and ash contents. The added solid carbon sourced component of liquid biofuel is green, renewable and carbon neutral, thereby reducing the carbon footprint of the energy being produced.

The biochar feedstock, before being dispersed into a liquid biofuel produced in accordance with the various embodiments of the invention, generally has less inherent caloric value, as measured in BTUs per pound or per gallon, than the same volume of petroleum based liquid fuel. Until now, there has been no reasonably practical method, beyond moderate increases due to improved refining techniques, to increase the inherent caloric energy value of either bio fuel based liquids or petroleum based liquids. The novel liquid fuel resulting from the various embodiments of the invention where specially processed biochar solids are dispersed or blended into a non-water based fluid fuel has a higher inherent energy value per unit volume or weight.

The liquid biofuel based on the biochar of the various embodiments of the invention is easier and safer for all purposes than a powdered, pelletized or cubed form of processed biomass to transport and store, deliver and convey, and may be used in directly in burners, misters, boilers, or gasifiers, compression ignition and combustion engines, and turbines that are designed to burn conventional petroleum distillates or liquid green energy oil derived fuels. The energy provided by such a fuel produces increased energy, gallon for gallon, or pound for pound, with a reduced carbon footprint, reduced atmospheric emissions and reduced residual left-over ash when compared to other solid raw biomass fuels.

It is contemplated that the biofuel manufactured in accordance with the various embodiments of the invention may be used as a standalone fuel to be used in burners and engines such as diesel engines, or it may also be used to fuel a jet or combustion turbine engine. The biofuel can be blended with a bio-oil liquid for a 100% green liquid solution or a petroleum based fuel oil for an environmentally improved petroleum based fuel oil. It is also contemplated that the liquid biofuel may be used as an additive to petroleum based fuels, such as heavy fuel oil or bunker oil marine diesel fuel.

One example of such a use would be to incorporate the liquid biofuel of the various embodiments described above into low sulfur bunker fuel oil. Such low sulfur fuel currently sells for between $800 and $990 per ton. Liquid biofuel product in accordance with the embodiments of the invention would have insignificant amounts of minerals such as sulfur and would not remove or counteract or react adversely with any of the desired qualities of low sulfur bunker fuel oil or conventional bunker C heavy fuel oil including those related to lubricity, cetane rating, and the combustion components of low sulfur or conventional bunker fuel oil.

Liquid biofuel may be priced lower than petroleum based bunker fuel. It may be added to low sulfur bunker fuel oil such that it comprises, for example, 25% to 40% of the total volume of the fuel mix, thereby significantly reducing the cost of the combined fuel per gallon or per ton, while not compromising the efficacy of the primary bunker fuel oil component and without increasing any adverse effects of sulfur or other minerals, yet maintaining, or increasing, the energy value of the combination fuel. Even if this blended mix resulted in increased the consumption of the fuel oil mix to provide the same operating parameters for ship's engines, the increased amount of energy provided at a lower cost in the blend more than offsets the marginally increased consumption.

On a cost basis, the blended fuel can be mixed with conventional bunker fuel and can achieve a lowered overall sulfur percentage to enable more cost effective compliance with laws requiring reduced sulfur emissions of fuels consumed within 200 miles of a coastline. It is anticipated that savings of $150 to $200 per ton of fuel is possible by admixing the colloidal liquid biofuel into low sulfur bunker fuel oil, with savings of similar magnitude expected when mixed into conventional higher sulfur containing bunker C fuel.

The biochar colloid dispersion in accordance with the various embodiments of the invention may also be used to fortify the product known as Biodiesel. Biodiesel is generally regarded as having less energy density or less heating value than petroleum based diesel fuels. Dispersing a colloidal suspension of biochar in biodiesel can substantially increase the energy density of the biodiesel. For example, adding and dispersing three pounds of biochar with a lower heating value net energy density of 10,000 BTU/pound to a B100 biodiesel having a net lower heating value of 119,550 BTU/pound results in a fuel with a combined caloric value of 149,500 BTU/pound. This new colloid dispersion creates a fuel exceeding the net heating value of #2 diesel, which is between 130,000 and 142,000 BTU/pound.

Similarly, a biochar colloidal dispersion in accordance with the various embodiments of the present invention may also be used as an additive to heavy fuel oil or Bunker C fuel. Should the addition of the biochar result in increased viscosity of the Bunker C, that viscosity can be further controlled using conventional means, such as heating the Bunker C to improve flow, or through the use of Dimethyl Ether (DME) to reduce viscosity. Combining a biochar dispersion with Bunker C and using DME to reduce and control viscosity allows the formulator to enhance the Bunker C by dispersing larger amounts of biochar in the colloid, while maintaining a workable viscosity. Thus, the combination provides a fuel with increased heat or energy density/content at a lower price and with a workable viscosity than could otherwise be achieved through use of Bunker C alone.

Such a fuel would be capable of being used in a slow cycle Sulzer type diesel engine found in most ships currently. Alternatively, it could be misted and burned in an aeroderivative combustion turbine with or without pre-gasification. Such a fuel could also be misted and/or mixed and blended with other fuels and burned in conventional boiler applications or in direct fired misted coal or diesel oil applications.

Other advantages of the liquid biofuel manufactured in accordance with the various embodiments of the present invention are that the combined fuel would not increase the known safety risks associated with liquid petroleum based fuels nor would it contribute to the risk of explosion of the combined fuels, either during use, storage or transportation. Furthermore, any spillage of the biofuel not yet combined with any petroleum based fuel will not result in any environmental contamination of air, soil or water. Moreover, because the particularized biomass biochar is dispersed in a non-aqueous solvent, such as a bio-oil, fuel oil or other suitable solvent, it eliminates storage, delivery, fuel moisture and blending problems that would otherwise result from using blended oil and water-based dispersions, such as water-based coal slurries.

Moreover, such a fuel is "green" in the sense that it is produced from grown plant matter and also considered renewable and sustainable because it is derived from biomass that is continuously produced. Furthermore, the production and use of biofuels in accordance with the various embodiments of the invention are environmentally protective because the raw biomass furnish, if not used in this manner, would decompose or otherwise simply be discarded, dumped into landfills or disposed of in other dry waste depositories. Further, since the raw biomass is not dumped into landfills, or otherwise left to simply decompose, the production of the novel biofuel of the embodiments of the invention reduces the proliferation of harmful environmental gasses such as methane, which is known to be twenty times more harmful to the atmosphere than carbon dioxide.

While particular embodiments of the present invention have been described, it is understood that various different modifications within the scope and spirit of the invention are possible. The invention is limited only by the scope of the appended claims.

We claim:

1. A method of making a green biofuel based on renewable biomass feedstock, comprising:
   receiving biomass feedstock having an initial moisture content;
   processing the biomass feedstock by introducing the biomass feedstock into a torrifier to produce a biochar having a post processing moisture content lower than the initial moisture content and a liquid component;
   extracting the liquid component from the torrifier;
   extracting a selected material from the extracted liquid component, the selected material extracted from liquid component being selected from the group consisting of chemicals and salts present in the biomass feedstock before the biomass feedstock is introduced into the torrefier;
   extracting biochar from the torrifier;
   particlizing the biochar; and
   forming a colloidal fluid from the particlized biochar and a non-aqueous combustible liquid, the colloidal fluid suitable for use as a fuel in a combustion engine without further processing.

2. The method of claim 1, wherein forming a colloidal fluid includes dispersing the particlized biochar in the non-aqueous combustible liquid.

3. The method of claim 1, wherein the non-aqueous combustible liquid is bio-oil.

4. The method of claim 1, wherein the non-aqueous combustible liquid is a petroleum based liquid.

5. The method of claim 4, wherein the petroleum based liquid is diesel fuel.

6. The method of claim 4, wherein the petroleum based liquid is oil.

7. The method of claim 1, wherein particlizing the biochar produces a biochar having a particle distribution in the range of 10 micron to 100 nanometers.

8. The method of claim 7, wherein the particle distribution has an average particle size of 200 nanometers to 400 nanometers.

9. The method of claim 4, wherein the petroleum based liquid is bunker fuel oil.

10. The method of claim 1, wherein the biochar is hydrophobic.

11. The method of claim 1, wherein the biochar is friable.

12. The method of claim 1, wherein the biomass feedstock includes waste from a process that produces a combustible liquid from raw biomass.

13. The method of claim 1, wherein the selected material is lithium.

14. A method of producing a green biofuel based on renewable biomass feedstock, comprising:
   receiving a renewable biomass feedstock;
   processing the renewable biomass feedstock by introducing the biomass feedstock into a torrefier;
   heating the renewable biomass feedstock in the torrefier at a temperature in the range of 200 degrees centigrade to 350 degrees centigrade to produce a friable hydrophobic biochar and a liquid component from the renewable biomass feedstock;
   extracting the friable hydrophobic biochar from the torrefier;
   particlizing the friable hydrophobic biochar into submicron size particles; and
   forming a colloidal fluid by combining the submicron size particles with a combustible liquid, the colloidal fluid suitable for use as a fuel in a combustion engine without further processing.

15. The method of claim 14, wherein the combustible liquid is a bio-oil.

16. The method of claim 14, wherein the combustible liquid is a petroleum based liquid.

17. The method of claim 14, wherein the combustible liquid is a blend of bio-oil and a petroleum based liquid.

18. The method of claim 14, wherein the combustible liquid is a petroleum based liquid blended with bunker oil.

19. A method of producing a biofuel from a biomass feedstock, comprising:
   receiving a biomass feedstock having an initial moisture content;
   processing the biomass feedstock in a torrefier operating at a temperature in the range of 200 degrees centigrade to 350 degrees centigrade to produce a solid biochar and a liquid component, the solid biochar having a post processing moisture content lower than the initial moisture content;
   particlizing the biochar; and
   combining the particlized biochar with a combustible liquid to form a colloidal dispersion of the particlized biochar in the combustible liquid, the combustible liquid suitable as a fuel in a combustion engine without further processing.

20. The method of claim 19, wherein the combustible liquid is bunker oil.

21. The method of claim 19, wherein the liquid component is processed to extract a selected chemical from the liquid.

22. The method of claim 19, wherein the liquid is processed to extract a selected mineral from the liquid component.

23. The method of claim 19, wherein the liquid component is processed to extract a selected salt from the liquid.

24. A green liquid fuel; comprising:
   a combustible colloidal suspension of a particlized solid biochar and bunker oil, the solid biochar extracted from a torrifier operating at a range of 200 degrees centigrade to 350 degrees centigrade, particalized and dispersed, without additional processing,
   into the bunker oil, the combustible colloidal suspension having an energy value higher than an intrinsic energy density of the bunker oil.

25. The green liquid fuel of claim 24, wherein the biochar has an average particle size of less than or equal to 10 microns.

26. The green liquid fuel of claim 25, wherein the biochar has an average particle size in the range of one micron to 100 nanometers.

27. The method of claim 14, wherein the combustible liquid is bunker oil.

28. The green liquid fuel of claim 24, wherein the combustible colloidal suspension is combined with low sulfur bunker fuel oil in an amount in the range of 25% to 40% of a total volume of the combustible colloidal suspension and bunker fuel oil combination.

29. The green liquid fuel of claim 24, wherein the combustible colloidal suspension has a higher energy value/pound than bunker oil alone.

30. The green liquid fuel of claim 24, wherein the combustible suspension has a higher energy value/gallon than bunker oil alone.

* * * * *